(12) United States Patent
Wang et al.

(10) Patent No.: US 7,391,895 B2
(45) Date of Patent: Jun. 24, 2008

(54) METHOD OF SEGMENTING A RADIOGRAPHIC IMAGE INTO DIAGNOSTICALLY RELEVANT AND DIAGNOSTICALLY IRRELEVANT REGIONS

(75) Inventors: Xiaohui Wang, Pittsford, NY (US); Hui Luo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 723 days.

(21) Appl. No.: 10/625,919

(22) Filed: Jul. 24, 2003

(65) Prior Publication Data

US 2005/0018893 A1 Jan. 27, 2005

(51) Int. Cl.
*G06K 9/00* (2006.01)

(52) U.S. Cl. ............... 382/132; 382/171; 382/173; 382/294

(58) Field of Classification Search .......... 382/128, 382/131, 132, 171
See application file for complete search history.

(56) References Cited

U.S. PATENT DOCUMENTS

| | | | | |
|---|---|---|---|---|
| 5,164,993 A | * | 11/1992 | Capozzi et al. | 382/132 |
| 5,268,967 A | * | 12/1993 | Jang et al. | 382/132 |
| 5,606,587 A | * | 2/1997 | Barski et al. | 378/62 |
| 5,862,249 A | * | 1/1999 | Jang et al. | 382/132 |
| 5,889,882 A | * | 3/1999 | Senn et al. | 382/132 |
| 6,212,291 B1 | | 4/2001 | Wang et al. | |
| 6,775,399 B1 | * | 8/2004 | Jiang | 382/128 |
| 2002/0172403 A1 | * | 11/2002 | Doi et al. | 382/128 |

FOREIGN PATENT DOCUMENTS

| | | |
|---|---|---|
| EP | 0610605 | 7/1997 |
| EP | 0742536 | 9/2000 |
| EP | 1 256 907 | 11/2002 |

OTHER PUBLICATIONS

Wang et al.; "Method for recognizing multiple radiation fileds in computed radiography", SPIE vol. 3661, Feb. 1999.*
Barski et al.; "New automatic tone scale method for computed radiography", SPIE vol. 3335, Feb. 1998.*
Automatic and exam-type idependent algorithm for the segmentation and extraction of foreground, background, and anatomy regions in digital radiographic images, Xiaohui Wang et al., Medical Imaging 2004: Image Processing, pp. 1427-1434.
Enhancement for Computed Radiographic Images, Roger S. Gaborski et al., 1995 IEEE, pp. 27-34.
Antonuk et al., A high resolution, high frame-rate, flat panel TFT array for digital x-ray imaging, 1994, pp. 118-128, SPIE Medical Imaging.

* cited by examiner

*Primary Examiner*—Bhavesh M. Mehta
*Assistant Examiner*—John B Strege (57) ABSTRACT

A method of segmenting a radiographic image into diagnostically relevant and diagnostically irrelevant regions comprising: acquiring a digital radiographic image including a matrix of rows and columns of pixels; detecting the initial background left point of a histogram of the image; detecting the foreground of the image; regenerating the background of the image by region growing; validating the background of the image; merging the background and foreground regions of the image as diagnostically irrelevant regions; and extracting the anatomy region of the image as the diagnostically relevant region.

12 Claims, 10 Drawing Sheets

FIG. 10a
DETECTED BACKGROUND

DETECTED FOREGROUND

FIG. 10b

BACKGROUND + FOREGROUND

TRANSITION GAP

FIG. 10c

BACKGROUND MERGED WITH FOREGROUND

METHOD OF SEGMENTING A RADIOGRAPHIC IMAGE INTO DIAGNOSTICALLY RELEVANT AND DIAGNOSTICALLY IRRELEVANT REGIONS

FIELD OF THE INVENTION

This invention relates in general to the processing of digital radiography, and in particular to the segmentation of a digital radiographic image into diagnostically relevant and diagnostically irrelevant regions.

BACKGROUND OF THE INVENTION

The recent advance in digital radiographic imaging systems, such as the flat-panel based direct digital radiographic (DR) systems ("A high resolution, high frame-rate, flat-panel TFT array for digital x-ray imaging," Proceedings of SPIE Medical Imaging, Antonuk et al., vol. 2163, pp 118-128, 1994) and the storage phosphor based computed radiographic (CR) systems ("Introduction to medical radiographic imaging," Eastman Kodak Company, 1993) etc, allow the separation and optimization of image acquisition, processing, and display processes individually. The image pixel data are manipulated during the image-processing step so as to optimize the image information acquired on the radiograph and to help the radiologists to better perceive even the subtlest diagnostic details. Optimizing diagnostic details depends on the knowledge of the location and characteristics of both diagnostically relevant and diagnostically irrelevant regions in the radiograph. The scope of this invention therefore relates to the automatic segmentation of a digital radiograph into anatomy (diagnostically relevant regions), foreground and background (diagnostic irrelevant regions).

Figure 1A:
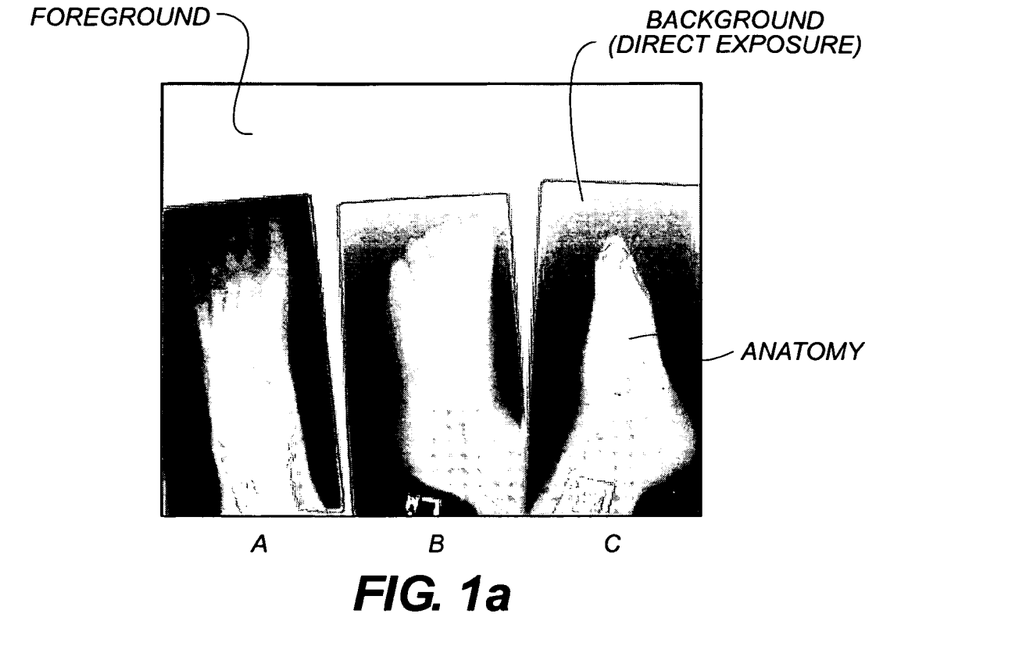
FIG. 1a is a diagrammatic view which shows an example of a foot radiograph acquired with CR, and the definitions of image foreground, background (direct exposure), and anatomy.

FIG. 1(a) shows an example of a foot radiograph acquired with CR. The foot was exposed at three viewing angles A, B, C using the same storage phosphor cassette but at different cassette regions. The anatomy in this radiograph is the foot and is considered diagnostically relevant. The regions in the radiograph where x-rays directly expose the storage phosphor are diagnostically irrelevant, which are later referred to as the background or direct exposure region. Collimation was used during the x-ray exposure to reduce unnecessary radiation to the anatomy that is irrelevant to diagnosis and to confine the x-rays to a local region of the cassette. The regions in the radiograph collimated outside the x-ray radiation field are diagnostically irrelevant, which are later referred to as the foreground region.

Figure 1B:
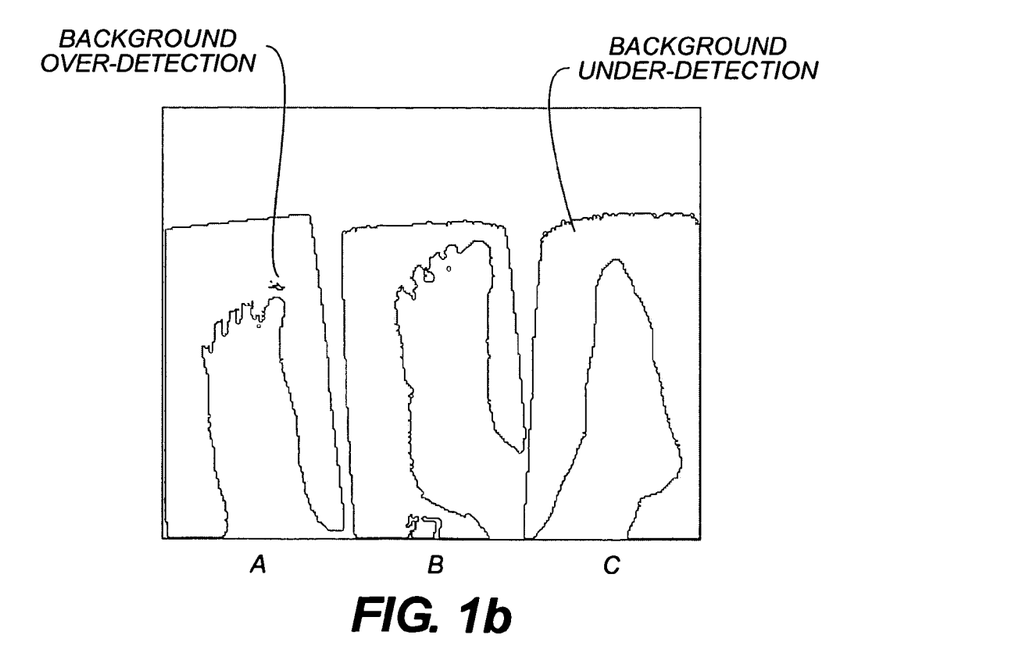
FIG. 1b is a diagrammatic view which indicates over- and under-detection of image background using a known method.

The work of Barski et al. taught a method of determining the direct exposure regions in a radiograph ("Determination of direct x-ray exposure regions in digital medical imaging," U.S. Pat. No. 5,606,587). However, this method uses a single value, namely background left point, to threshold the input image to generate a binary map. Although this method is suitable for the purposes for which it was intended, in the case when the direct exposure region has a large intensity non-uniformity, which can be caused by the non-uniform intensity distribution of the incident x-rays or by the exam requirements that need multiple views of the anatomy at different exposures levels another method may be needed. FIG. 1(b) shows an example of the result using Barski's method, which indicates that the background can be over-detected and under-detected at the same time. The thresholds used in this method also vary from one exam-type (bodypart and projection) to the other, which may not work well when exam-type information is unavailable.

Pieter disclosed a method to determine the foreground region in a radiograph ("Method of recognizing an irradiation field," European Patent 0,610,605). However, this method can only deal with single-exposed radiographs, and can not be used to completely segment the diagnostically relevant regions where there are two or more radiation fields in a single radiograph, such as the example in FIG. 1(a). To address this limitation, Piet et al disclosed an improved method of detecting the foreground regions ("Method of recognizing one or more irradiation fields," European Patent 0,742,536). However, both Pieter and Piet failed to teach a method for determining the background regions. Wang et al., showed a method based on Barski's direct exposure detection to determine the image foreground regions ("Method for recognizing multiple irradiation fields in digital radiography," U.S. Pat. No. 6,212,291). This method, however, still did not fulfill all of the needs of background detection.

Given the drawbacks and limitation of the prior art, there is a need for a method that is exam type independent and that can automatically segment digital radiographic images into anatomy, foreground, and background regions.

SUMMARY OF THE INVENTION

According to the present invention, there is provided a solution to the problems and a fulfillment of these needs.

According to a feature of the present invention, there is provided a method of segmenting a radiographic image into diagnostically relevant and diagnostically irrelevant regions comprising:

acquiring a digital radiographic image including a matrix of rows and columns of pixels;

detecting the initial background left point of a histogram of said image;

detecting the foreground of said image;

regenerating the background of said image by region growing;

validating the background of said image;

merging the background and foreground regions of said image as diagnostically irrelevant regions; and extracting the anatomy region of said image as the diagnostically relevant region.

ADVANTAGEOUS EFFECT OF THE INVENTION

The invention has the following advantages.

1. It is independent of the exam type of the radiograph.
2. It can automatically segment a radiograph into foreground, background and anatomical regions with no over- or under-detection.
3. It can successfully detects the whole image background using region growing regardless of the background non-uniformity.

BRIEF DESCRIPTION OF THE DRAWINGS

FIG. 8b is a diagrammatic view which show foreground regions detected based on FIG. 8a.

DETAILED DESCRIPTION OF THE INVENTION

Figure 2:
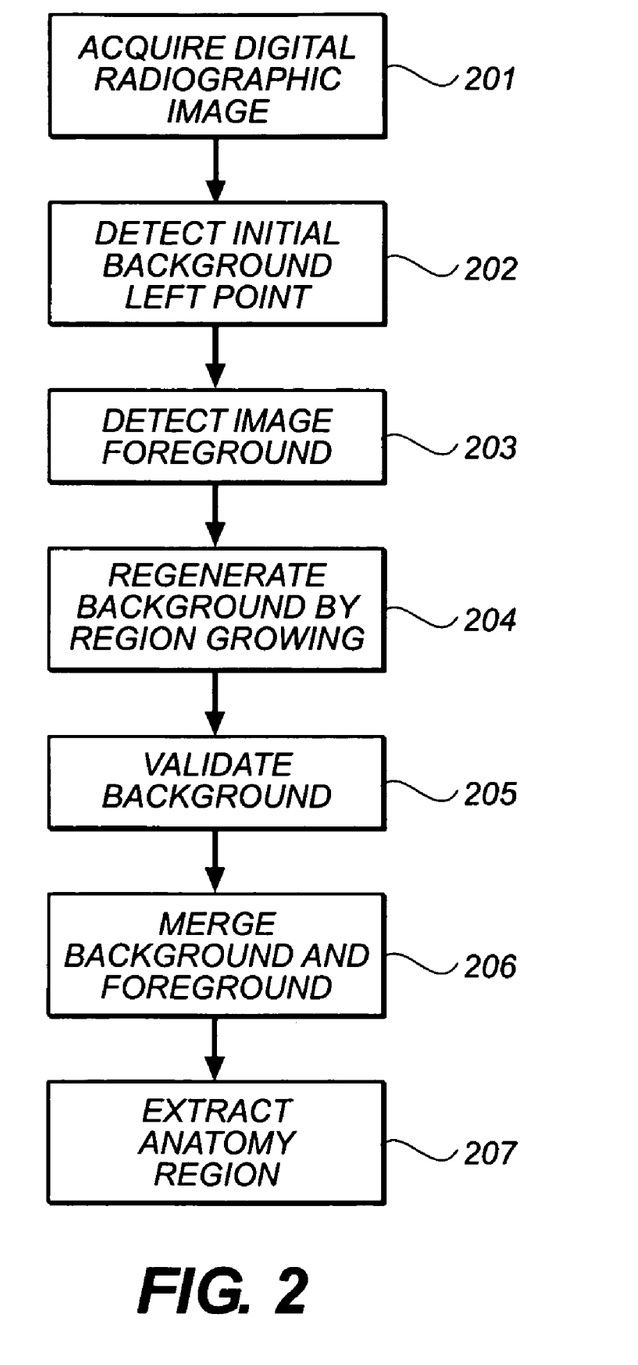
FIG. 2 is a flow chart of the major processing steps in one embodiment of the present invention.

Referring now FIG. 2, an embodiment of the present invention will be described.

A digital radiographic (medical) image is acquired (box 201) such as from a diagnostic imaging device (MRI, CT, PET, US), from a direct digital or computed radiography device, from an x-ray film digitizer, from a medical image archive. The digital medical image includes an array or matrix of rows (lines) and columns of pixels having a gray scale range of a predetermined range of bits or code values (e.g., 8 or 12 bits). The digital medical image is processed in an image processor, such as a digital computer and output to a display or hard copy. The method of the invention is carried out in the image processor.

This invention first tries to improve the background detection algorithm disclosed in U.S. Pat. No. 5,606,587, issued Feb. 25, 1997, inventors Barksi et al., by making it exam-type independent and at the same time to provide a reasonable initial background left point (box 202) for the acquired digital radiographic image. Then it takes this initial background left point to threshold the digital radiographic image in order to create an initial background map, which is used as one of the input for applying the foreground detection algorithm disclosed in U.S. Pat. No. 6,212,291, issued Apr. 3, 2001, inventors Wang et al. (box 203). This results in a well-detected foreground region and a less-than-desirable background region. Later on, a region growing process is performed from some identified "seeds" to regenerate the whole background map (box 204). After the new background is validated (box 205), the background and foreground regions are merged together (box 206) and finally the rest of image region is identified as anatomy (box 207).

Figure 3:
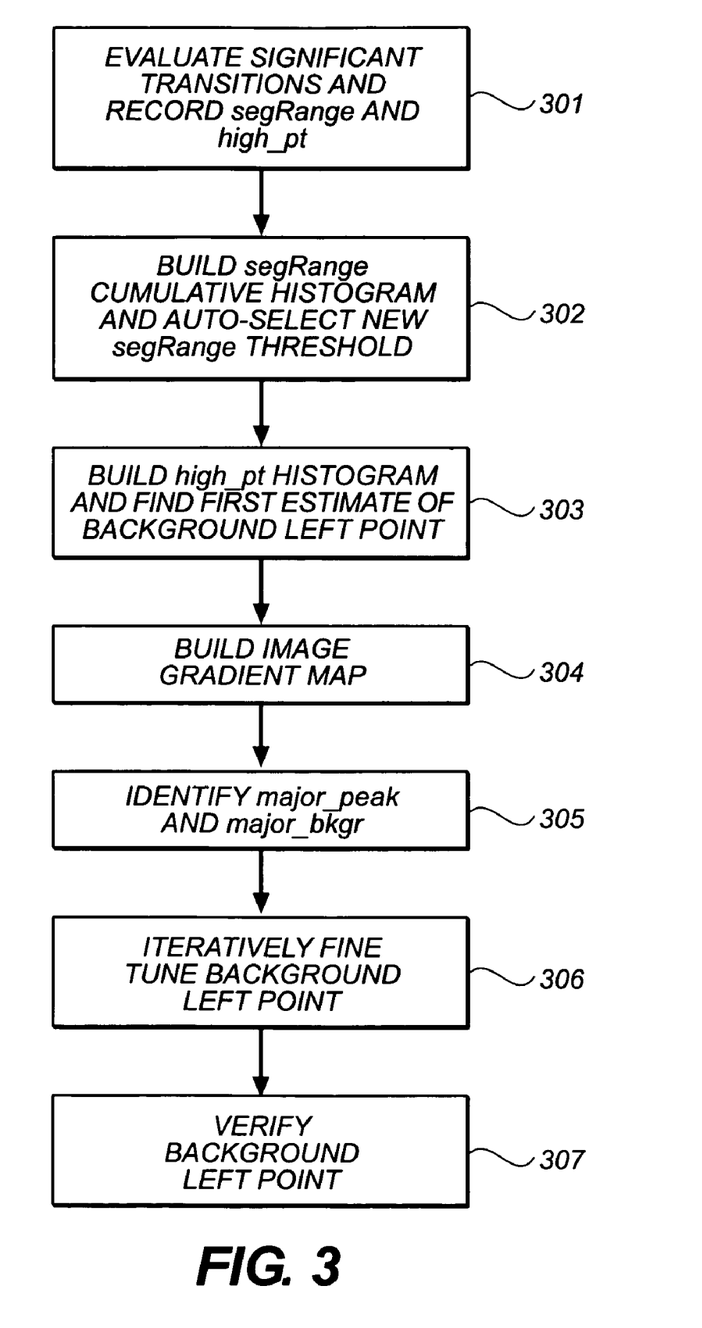
FIG. 3 is a flow chart of the major processing steps in an embodiment of the present invention for background detection.

The flow chart of the initial background detection algorithm is shown in FIG. 3. In summary, this part of the algorithm tries to find a good sample of image background pixels, from which a reasonable value (later referred to as initial background left-point) is determined which can be used to binarize the image into background and non-background regions. The background determined may not be perfect, but is sufficient for the foreground detection step (box 203).

Figure 4A:
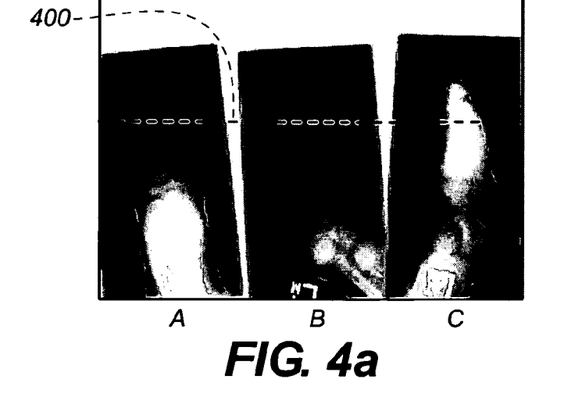
FIG. 4a is a diagrammatic view which uses a dotted line to represent a sample of an image row.
Figure 4B:
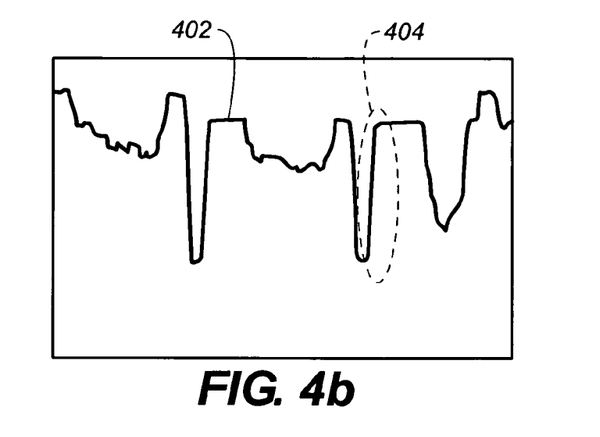
FIG. 4b is a graphical view of the profile of the sampled line of FIG. 4a (darker image regions have higher pixel values). A transition sample is marked by the ellipse.
Figure 4C:
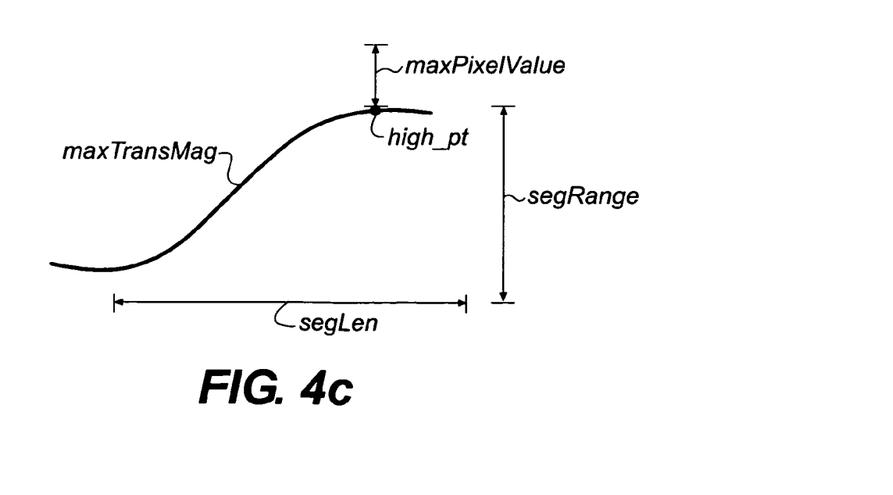
FIG. 4c is a graphical view of a modified presentation of the ellipse region of FIG. 4b. Some definitions, such as maxTransMag, segLen, segRange, high_pt, and maxPixelValue, are also indicated.

The process starts with analyzing each column and row of image pixels for all the rising and falling transitions (box 301) in order to find all candidate background to foreground (BF) and background to skinline (BS) transitions. The horizontal dotted line 400 in FIG. 4a represents a sample row of image pixels, where those pixels in the darker region have higher pixel values. The profile of the sampled row is plotted as line 402 in FIG. 4b, in which a rising transition sample is marked by the dotted ellipse 404 and magnified in FIG. 4c. As shown in FIG. 4c, there are four major measurements associated to each transition, transition width (segLen), transition range (segRange), maximum transition slope (maxTransMag), and transition high-point value (high_pt). Each of the four measurements is computed and recorded individually for all the transitions in the image. The BF and BS transitions tend to have a larger transition length, transition slope, and maximum transition magnitude, plus the transition high-point value tends to have a larger value. Therefore, the following criteria are applied to eliminate those false candidate transitions that may correspond to bone-tissue, tissue-tissue, and any other transitions:

segLen>threshold_segLen,
segRange>threshold_segRange,
maxTransMag>threshold_transMag,
high_pt>maxPixelValue−Δ, where maxPixel Value is the maximum pixel value of the image, and Δ is a predetermined value which ensures that it is large enough to include all the BF and BS transitions, and at the same time small enough to exclude as many as possible any other transitions.

The aforementioned thresholds are generically created for all exam-types. They can be optimized accordingly when exam type information is available. However, this invention does not have to rely on exam-type information, it extracts a set of features from the image itself then adaptively detects the image background.

The resultant transition candidates in this processing step may still contain some false detections other than the valid BF and BS transitions. Because the segRange values of the undesired bone-tissue and tissue-tissue, etc. transitions are relatively small compared to those of the valid transitions, they will most likely be distributed at the low end of the segRange population. Based on this, the histogram of segRange is built, from which the cumulative histogram is computed, and a new threshold segRange is set at a certain percentile such as 50% of the cumulative histogram (box 302). This new threshold is used to further prune the transition candidates. Slightly over-pruning is not a problem as long as there are enough candidate transitions left for subsequent processing. Because images of different patients and different exam types usually have different BS transition characteristics, the selection of a new threshold segRange based on a certain percentile of the cumulative histogram can automatically adapt the pruning process based on the image characteristics itself, i.e., making the algorithm independent of exam type information.

The high_pt of the detected candidate BF and BS transitions are considered to be candidate background pixels in the image. However, the background region for some images may encompass an entire image line (row or column) and there is no significant transition that can be found within the line using the aforementioned transition detection process. To solve this problem, first, a pixel value threshold (thresh_column and thresh_row) is defined for each image row and column:

thresh_column [i]=minimum high_pt of all candidate BF and BS transitions in column i, threshk_row [j]=minimum high_pt of all candidate BF and BS transitions in row j.

Figure 5A:
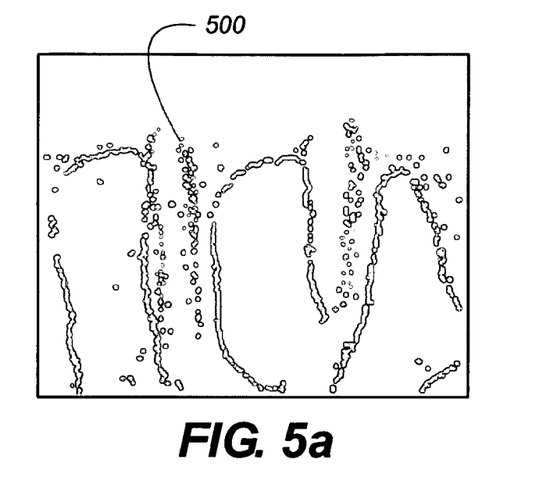
FIG. 5a is a diagrammatic view which shows an identified candidate background pixels.

Second, those image pixels whose values are greater than both their corresponding row and column thresholds are considered candidate background pixels. An example of the candidate background pixels is shown in FIG. 5a as coarsely distributed white dots 500. The image is considered to have no background if there are not enough number of candidate background pixels are found at this processing step.

Figure 5B:
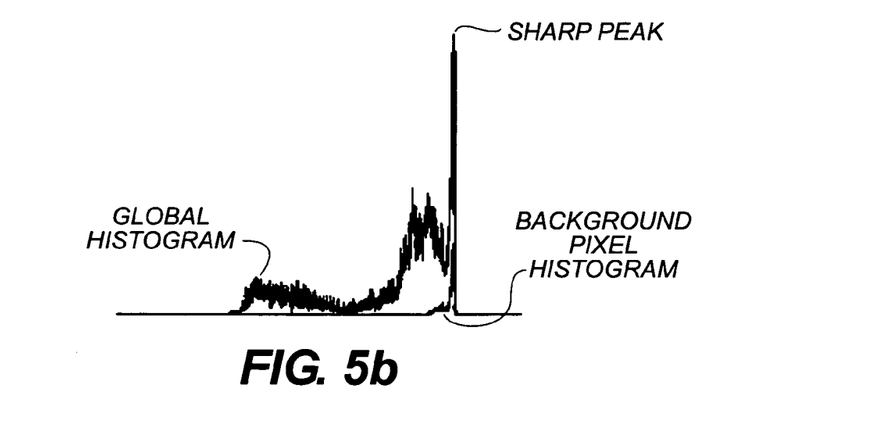
FIG. 5b is a graphical view which shows an image global histogram and a histogram of the candidate background pixels.
Figure 5C:
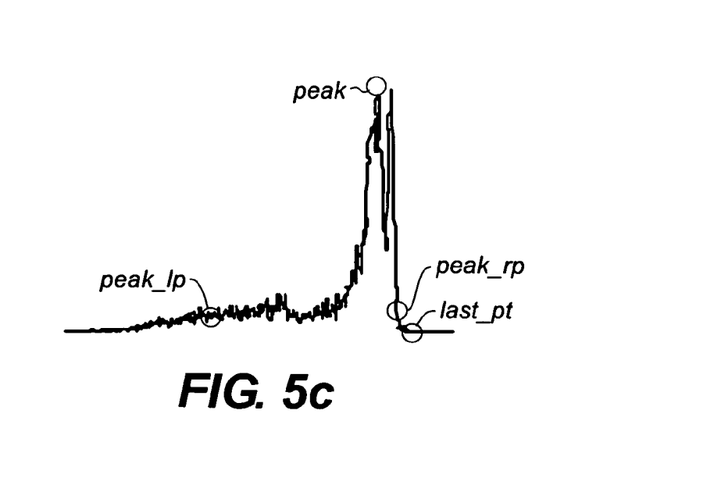
FIG. 5c is a graphical view which magnifies the candidate background pixel histogram of FIG. 5b and defines peak, peak_p, peak_rp, and last_pt.

A histogram of the high_pt for the identified candidate background pixels is built for the estimation of the overall characteristics of the image background (box 303). Because the background pixels have relatively higher values among all the image pixels, in a preferred embodiment of this invention, only those candidate background pixels whose high_pt values are within a certain range below the maximum pixel value of the whole image are included in the histogram calculation. FIG. 5b shows an example of the candidate background pixel histogram overlaid on top of the image global histogram. FIG. 5c shows the magnified candidate background pixel histogram, from which four features are extracted: peak, peak_lp, peak_rp, and last_pt. Feature peak is the location of the histogram peak, peak_lp (peak_rp) is the peak left (right) point, which is defined as the location in the histogram whose population exceeds a certain threshold, and last_pt is the last (highest) pixel value in the histogram. It needs to mention that these four aforementioned features will be used in the iteration process (box 306). If last_pt is too far below the maximum pixel value of the whole image or if the distance between last_pt and peak_rp is too far, it is considered that background does not exit. Otherwise, the resultant peak_lp value is taken as the first estimate of the background left point and is used as the threshold to get a first estimate of the image background region. Any image pixel having a higher value than peak_lp is considered as a background pixel, and all the rest of the pixels are considered as non-background pixels. The true background region, by definition, should be relatively smooth because this is the region where the direct x-rays expose the image receptor. The pixel values in the true background region therefore should be at the higher end of the image histogram and their distribution tends to be within a small range. Observation of the image histogram supports this judgement (FIG. 5b): the background pixels tend to create a sharp peak in the very high end of the histogram. This sharp peak is detected in the algorithm (box 305) as one of the unique features: major_peak, where major_peak=true if at least one sharp peak can be detected from the high end of the image histogram, and major_peak=false otherwise. Feature major_peak is used in the iteration process (box 306) to select different thresholds.

Figure 6A:
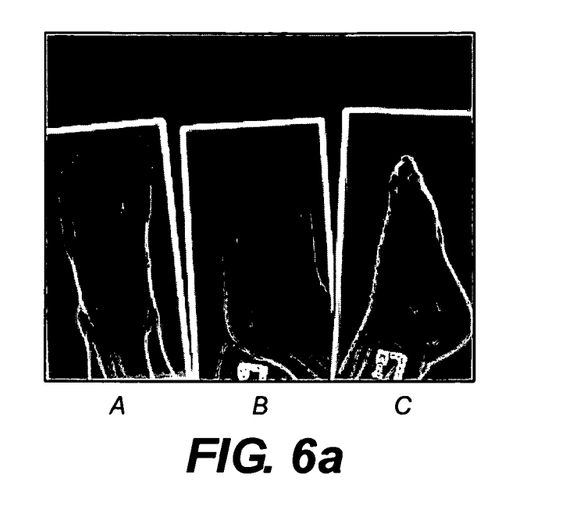
FIG. 6a is a diagrammatic view of an example of the gradient magnitude image.
Figure 6B:
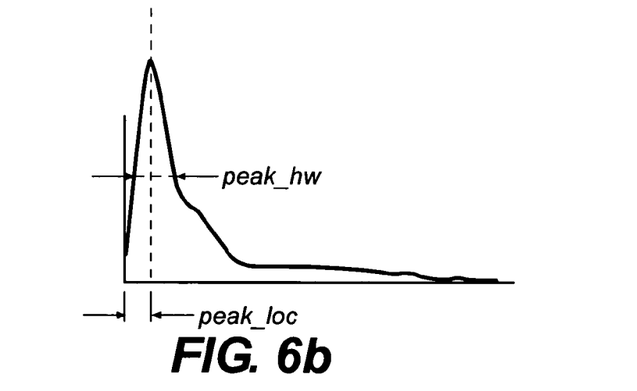
FIG. 6b is a graphical view of the histogram of the FIG. 6a image. Two parameters, peak_hw, and peak_loc, are defined.

The distribution of the background pixel values is within a relatively small range suggests that their variation should be relatively small too. Therefore, if the gradient is calculated from the original image (box 304) then the background region should have relative small gradient magnitude (FIG. 6a). When the histogram of the gradient magnitude is plotted (FIG. 6b), a relatively narrow (peak_hw) peak can be found near (peak_loc) the histogram origin. Feature peak_loc itself represents the most populated gradient magnitude, and peak_hw represent how small the variation of the most populated gradient magnitude is. Based on peak_loc and peak_hw a new feature is defined (box 305): major_bkgr, where major_bkgr=true if peak_loc<thresh_peak_loc and peak_hw<thresh_peak_hw, and major_bkgr=false otherwise. When major_bkgr=true the image most likely has a significant number of background pixels present, therefore, this feature is also used in the iteration process (box 306) to select different thresholds. There are many filters that can be used to calculate the image gradient, such as Robert, Sobel, Previtt, or isotropic filters. In a preferred embodiment of this invention, the gradient is calculated using the isotropic filter and square root is taken for the gradient magnitude.

The candidate background left point is initially set being equal to peak_lp then fine-tuned in the iteration step (box 306). The iteration concept is one of the most important features of the present invention in making the segmentation independent of exam type information. In this processing step, any image region having a higher pixel value than the background left point is considered as candidate image background and is validated based on the regional gradient magnitude. In particular, a measurement is defined:

$$\text{bkgr\_variance} = \sum_{i,j} gMag(i, j) / \sum_{i,j},$$

where gMag(i, j) is the gradient magnitude at pixel location (i, j) and the sum is over only the candidate background regions. Because the BF and BS transitions have fairly large gradient magnitudes, if the candidate background left point is defined too aggressively, i.e., not only the true background regions but also some regions of foreground or anatomy are included, the large gradient from BF and BS transitions can make bkgr_variance really large.

Based on this, the iteration starts with the initial background left point value (peak_lp), calculates bkgr_variance and checks if it is greater than a certain threshold. If it does, the background left point value will be increased by a certain amount, and then the iteration restarts again. Every time the background left point value increases, the number of candidate background pixels decrease by a certain amount and so does the size of candidate background regions. The criteria used for stopping the iteration are: number of iterations, number of candidate background pixels, and value of bkgr_variance. These criteria depend on the aforementioned two features: major_peak and majpr_bkgr so that the iteration can be controlled differently when either of major_peak or majpr_bkgr is true. The iteration stops if there are not enough candidate background pixels left or if there are too many iterations. This means either that the image background most likely does not exist, or if the criteria for bkgr_variance is met, that a reasonable background left point has been found. The decrement amount for background left point can be fixed in pixel value, can be a calculated value fixed in the amount of candidate background pixel decrement, or can be a combination of both. In a preferred embodiment of the present invention, the combination method is used to ensure that the decrement is fine enough for finding the most likely background left point but still large enough to minimize the number of iterations.

Figure 7:
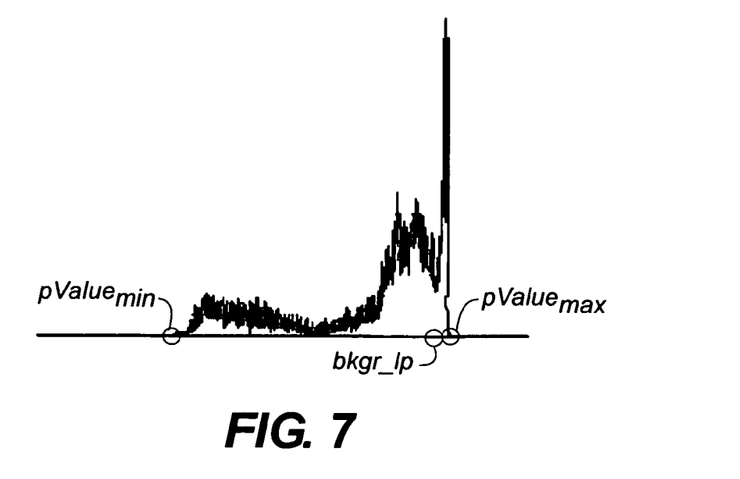
FIG. 7 is a graphical view showing an image global histogram, in which $pValue_{min}$, $pValue_{max}$, and bklp_lp are defined.

The final processing step is to verify the initial background left point (box 307). FIG. 7 shows an example of the whole image histogram, in which pValue$_{min}$ and pValue$_{max}$ are the minimum and maximum pixel values of the original image, and bkgr_lp is the background left point obtained from the iteration step. In a preferred embodiment of this invention, pValue$_{min}$ and pValue$_{max}$ are calculated from the cumulative histogram of the original image pixel values at some percentile levels, such as 0.5% and 99.9% for pValue$_{min}$ and pValue$_{max}$, respectively. One implementation of the verification step uses a rule-based reasoning process. For example, a valid background left point must satisfy the following criteria: (1) the value of bkgr_lp should be sufficiently large, (2) the dynamics range of the image, as defined by pValue$_{max}$ –pValue$_{min}$ should be sufficiently large, (3) the area of the background regions should be sufficiently large if either major_bkgr or major_peak is true etc, or should be sufficiently small otherwise.

Figure 8A:
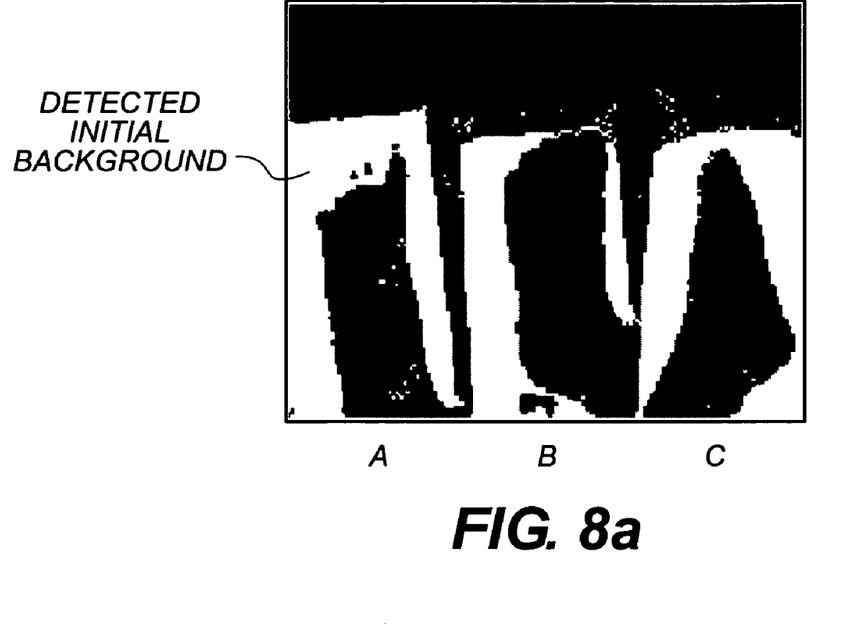
FIG. 8a is a diagrammatic view which shows the detected initial background regions.

The first rule is used because radiographs are exposed at a certain predetermined condition and the direct exposure regions tend to have a relatively high exposure. The dynamic range of a radiograph depends on the exposure technique, such as kVp etc, and the human anatomy imaged. Because the anatomy introduces quite a bit of x-ray attenuation, the acquired radiograph should have a reasonably large dynamic range if there is any background regions in the image, which is the rational for the second rule. The reason for the third rule is because the image tends to have a large background region when either major_bkgr or major_peak is true, or tends to have a small background region or none at all, otherwise. Finally, the number of candidate BF and BS transitions, whose high_pt values are higher than the initial background left point, is compared to the total number of candidate BF and BS candidates, and, if the ratio is too small, then the identified initial background left point is considered invalid. FIG. 8a shows an example of the detected background pixels, which is not perfect but is good enough for the subsequent foreground detection process.

Figure 8B:
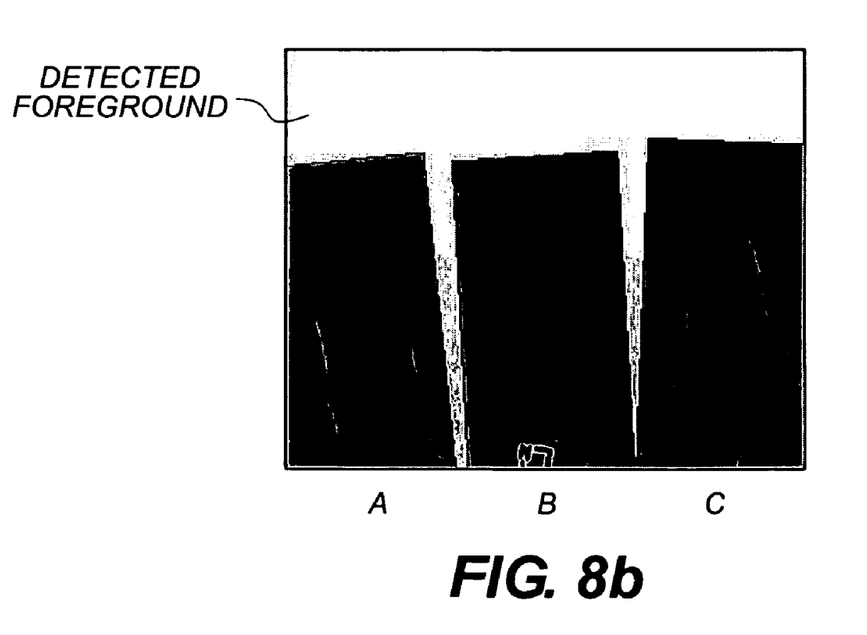

The foreground detection processing used step is disclosed in "Method for recognizing multiple irradiation fields in digital radiography," U.S. Pat. No. 6,212,291, inventors Wang et al. In summary, the algorithm (1) takes the original image and the initial background left point value as inputs, (2) uses a smart edge detection process to classify all significant transitions in the image, (3) conducts Hough Transform to delineate all the lines that are possible collimation blades, (4) finds candidate partition blade pairs if the image has several radiation fields, (5) uses a divide-and-conquer process to partition the image into sub-images containing only one radiation field, (6) identifies the best collimation for each sub-image. FIG. 8b shows an example of the detected foreground.

The background detected so far has many drawbacks, such as over- and under-detection as shown in FIG. 1(b) when the background region has a large non-uniformity. This processing step tries to overcome these drawbacks by taking advantage of the known foreground and regenerating the background region using region growing. In one embodiment of this invention, the new background region is regenerated using the region growing method from a set of known "seeds." These seeds can be the initial background pixels that have been detected before, or can be the detected background transition pixels etc. In one embodiment of the present invention, the criteria for region growing are based on the homogeneity between the seeds and the detected background region. It assumes that the pixel value distribution in the background region can be approximated by a Gaussian distribution. The method first computes an average ($\mu_{Background}$) and a standard deviation ($\sigma_{Background}$) of the detected background, then starting the region growing using a 3×3 neighborhood region of a seed. The merge condition is defined as follows:

$$\frac{|\mu - \mu_{Background}|}{\sigma_{Background}} \leq t,$$

where the constant t represents a confidence interval in a normal distribution. If an average pixel value ($\mu$) of a seed region falls within a predetermined confidence interval, say 90%, the seed region will be merged into the background, otherwise, it is marked as anatomy or foreground region. Once all seeds have been checked, a set of new seeds are generated around the boundary of the newly segmented background. Growing of the seed regions continues until no region can be merged with the background.

In another embodiment of the present invention, the detected candidate background transition pixels whose high_pt values are greater than the initial background left point are taken as the seeds. The region growing is based on the local pixel value gradient. In particular, the gradient is calculated based on a 2D detrending process. The original image is first partitioned into many partially overlapping 3×3 blocks, then each block is fit to a 2D bilinear function:

$$b(x_i, y_j) = ax_i + by_j + c,$$

where $x_i$ and $y_j$ are the pixel coordinates, $i \in [1,3]$, $j \in [1,3]$, and a, b, and c are the fitting parameters. Least square error $$\Delta^2 = \sum_{i,j=1}^{3} [i(x_i, y_j) - b(x_i, y_j)]^2$$

is used to find the best set of fitting parameters, where $i(x_i, y_j)$ is the image pixel value at $(x_i, y_j)$. The gradient magnitude for the center pixel of each block is defined as:

$$\mathrm{grad} = \sqrt{a^2 + b^2}.$$

The growing processing first starts with the known seeds, it then grows to its neighborhood if grad is smaller than a certain threshold. The rational is that the grad value should be relatively small in the background regions, but should be very large in the region near BF and BS transitions. The growing process merges all the background regions but will stop near BF and BS transitions therefore will not get into the anatomy region.

Figure 9A:
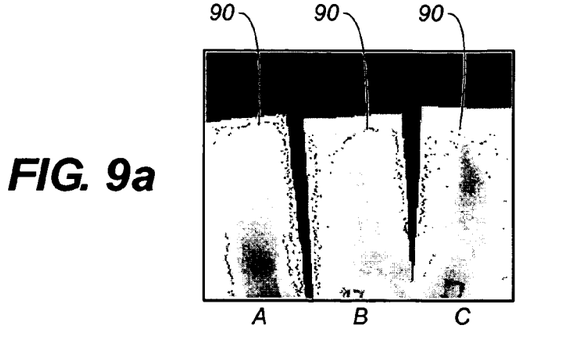
FIG. 9a is an image with foreground removed (the darkest region) then overlaid with the initial seeds for background region growing (the dark dots in the background regions).
Figure 9B:
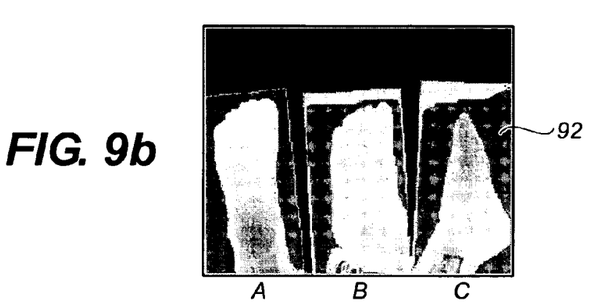
FIGS. 9b and 9c are diagrammatic views which show some intermediate results of background region growing.
Figure 9C:
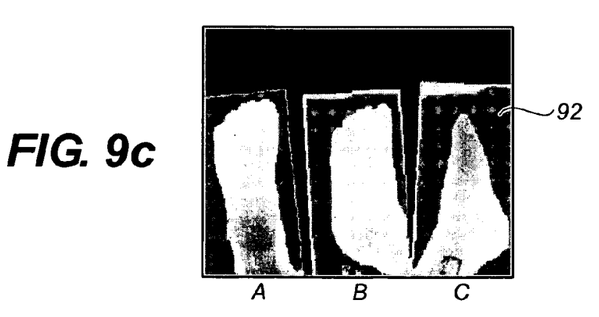
Figure 9D:
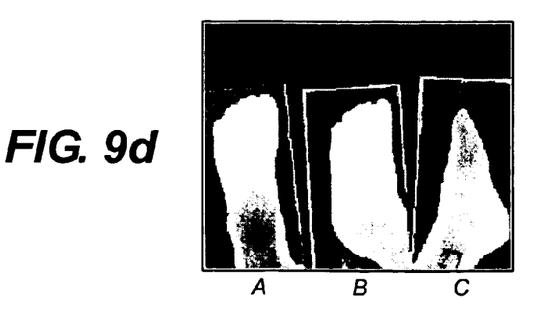
FIG. 9d is a diagrammatic view which shows the final detected new background regions.

An example of the region growing results are shown in FIG. 9a to 9d. FIG. 9a shows the seeds 90 overlays on top of the original image with foreground removed. FIG. 9b to 9c show some intermediate steps as to how the candidate background regions 92 grows. The final result in FIG. 9d shows no background over- and under detection (as in FIG. 1b).

There is a final validation step to check the background region grown from the seeds. Because the foreground is known and therefore can be eliminated from the analysis, a more accurate testing of the background pixels can be made. In particular, because the anatomy should be of a minimum size when background exits, the ratio between the background area and all the non-foreground area should not exceed a certain threshold, and the dynamic range of all the non-foreground area should be greater than a minimum threshold. Otherwise, the background detected is considered as invalid.

Figure 10A:
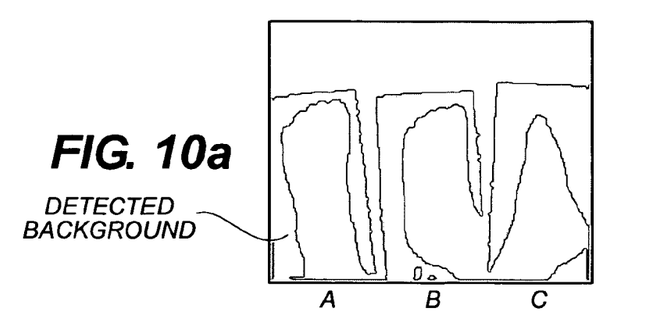
FIGS. 10a and 10b are diagrammatic views which show examples of the detected background and foreground regions, respectively.
Figure 10B:
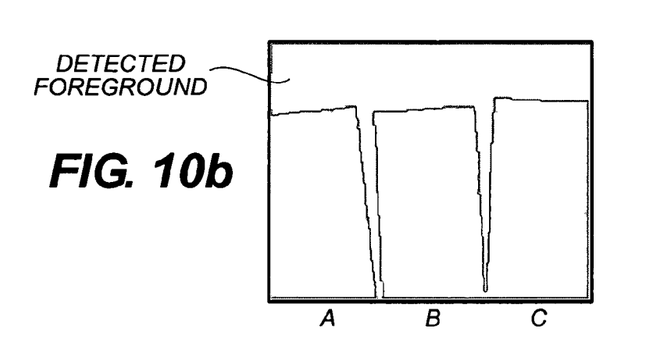
Figure 10C:
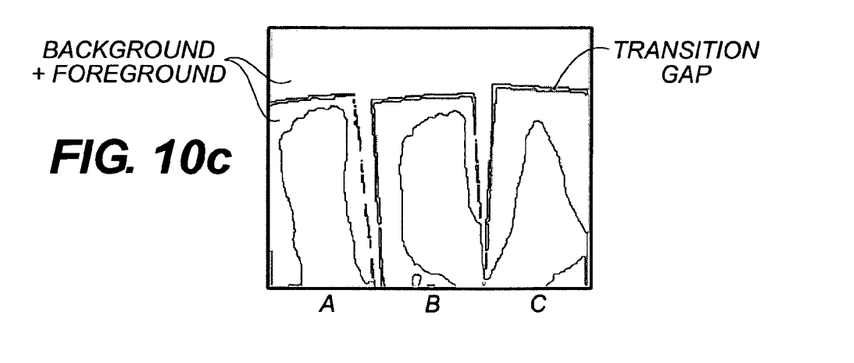
FIG. 10c is a diagrammatic view which shows the sum of foreground and background, from which the transition gaps are seen.
Figure 10D:
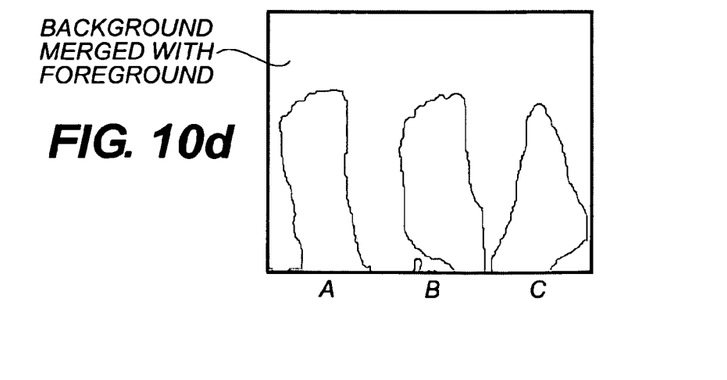
FIG. 10d is a diagrammatic view which shows the image with background and foreground merged together.

Both the background and foreground regions in the image are diagnostically irrelevant. The diagnostically relevant anatomical regions are extracted by merging and then excluding the foreground and background regions from the original image. FIGS. 10a and 10b show an example of the detected background and foreground regions, respectively, and FIG. 10c is the sum of the two. One can find that the foreground and background regions may not connect to each other so that there are transition gaps between them. These transition gaps must be removed in order to obtain a "clean" anatomical region. To do this, each column and row of pixels of the original image is analyzed. If a transition is found that begins with foreground then ends with background, or begins with background then ends with foreground, it is recorded. If within this transition there is a small number of pixels that are neither inside the background nor inside the foreground and are in the proximity of the transition maximum, this transition is used to "bridge" the foreground and background region. This process is repeated for every transition in each image row and column until all the transition gaps are removed. FIG. 10d shows an example of the resultant image.

Figure 11:
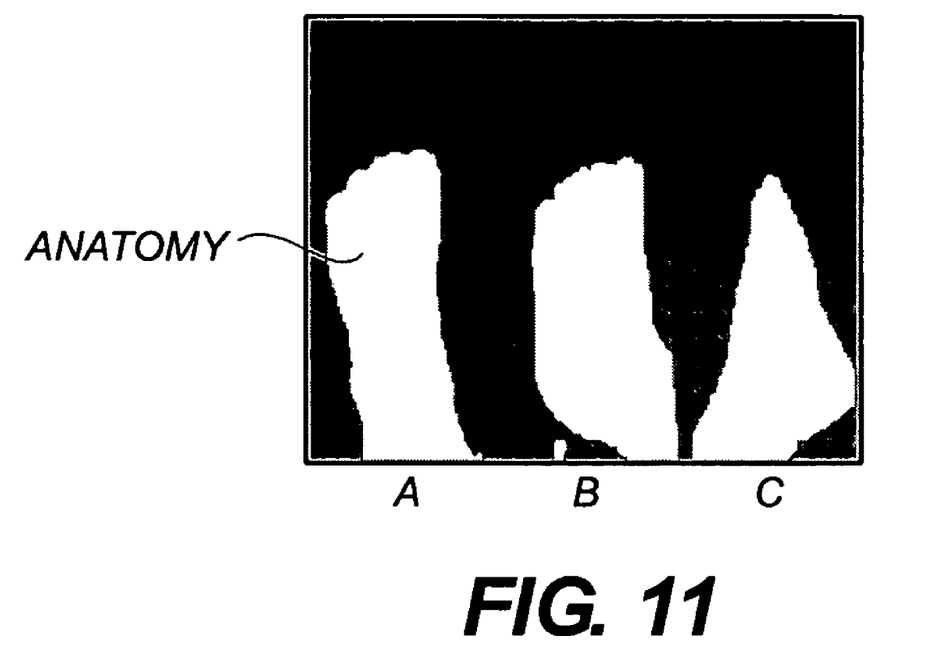
FIG. 11 is a diagrammatic view which shows the final anatomic region detected after the merged background and foreground are removed.

The anatomy area is extracted by subtracting the merged foreground and background regions from the original image. There may be some residuals left in the detected anatomy image that are diagnostically irrelevant, such as hardware markers etc. They are usually very small in size and may not constitute a problem for subsequent image processing. FIG. 11 shows an example of the detected anatomy region. In case hardware markers constitute a problem, the anatomy image can be further processed so as to refine the anatomical regions. For example, the anatomy image can be labeled such that each connected region is assigned a unique pixel value. Because the anatomy should generally connected and should be larger than any hardware markers in size, a histogram of the labeled image is calculated, the peak in the histogram will identify the pixel value of the largest connected region in the labeled image, therefore the largest connected region can be extracted while leaving out those small and diagnostically unimportant connected regions (e.g., hardware markers). If there are two or more connected regions of similar size, one can extract all as diagnostically important regions.

The invention has been described in detail with particular reference to certain preferred embodiments thereof, but it will be understood that variations and modifications can be effected within the spirit and scope of the invention.

| PARTS LIST | |
|---|---|
| 90 | seeds |
| 92 | background regions |
| 201 | processing step for acquiring digital radiographic image. |
| 202 | processing step for detecting initial background left point. |
| 203 | processing step for detecting image foreground. |
| 204 | processing step for regenerating background by region growing. |
| 205 | processing step for validating background. |

| -continued | |
|---|---|
| PARTS LIST | |
| 206 | processing step for merging background and foreground. |
| 207 | processing step for extracting anatomy region. |
| 301 | processing step for evaluating significant transitions and recording segRange and high_pt. |
| 302 | processing step for building segRange cumulative histogram and auto-selecting new segRange threshold. |
| 303 | processing step for building high_pt histogram and finding first estimate of background left point. |
| 304 | processing step for building image gradient map. |
| 305 | processing step for identifying major_peak & major_bkgr. |
| 306 | processing step for iteratively fine tuning background left point. |
| 307 | processing step for verifying background left point. |
| 402 | sampled row is plotted |
| 404 | dotted ellipse |
| 500 | distributed white dots |

What is claimed is:

1. A method of segmenting a radiographic image into diagnostically relevant and diagnostically irrelevant regions comprising:
   acquiring a digital radiographic image including a matrix of rows and columns of pixels;
   generating an initial background map using an initial background left point;
   detecting a foreground map of said image using the initial background map;
   regenerating a regenerated background map of said image;
   validating the regenerated background map of said image;
   merging the regenerated background map and foreground map of said image as diagnostically irrelevant regions; and
   extracting an anatomy map of said image as the diagnostically relevant region.

2. The method of claim 1 wherein said acquiring a digital radiographic image includes acquiring a digital radiographic image from one of the following:
   a diagnostic imaging device, a direct digital radiography or computer radiography device, and x-ray film digitizer, a digital radiographic image archive.

3. The method of claim 1 further comprising the step of detecting the initial background left point comprising:
   evaluating each row and column of image pixels for all rising and falling transitions for all candidate backgrounds to foreground (BF) and background to skinline (BS) transitions and record the transition range, transition width, the maximum transition slope and the transition high point;
   building transition range cumulative histogram and auto-selecting new transition range threshold;
   building a transition high point histogram and find a first estimate of a background left point;
   iteratively fine tuning the background left point; and
   verifying the background left point.

4. The method of claim 1 wherein said detecting the foreground map includes:
   providing as inputs said acquired digital radiographic image and said initial background left point;
   using a smart edge detection process to classify all significant transitions in said image;
   conducting a Hough Transform to delineate all the lines that are possible collimation blades;
   finding candidate partition blade pairs if said image has several radiation fields;
   lining a divide-and-conquer process to partition said image into sub-images containing only one radiation field; and identifying the best collimation for each sub-image to detect the foreground map.

5. The method of claim 1 wherein said regenerating the regenerated background map uses a region growing method from a set of known "seed" background pixels based on the initial background left point or a transition pixel.

6. The method of claim 1 wherein said validating said regenerated background map includes determining whether a ratio between the regenerated background map and all the non-foreground map exceeds a certain threshold and whether the dynamic range of all the non-foreground map is greater than a minimum threshold and if one or both are not then the regenerated background map is invalid.

7. The method of claim 1 wherein said merging the background and foreground maps of said image includes removing any transition gaps between said maps.

8. The method of claim 1 wherein said extracting the anatomy map is carried out by subtracting the merged foreground and background maps from said acquired image.

9. The method of claim 8 wherein extracting the anatomy map is followed by a refining process using image labeling to identify a plurality of largest connected regions as the anatomy maps.

10. The method of claim 1, wherein said regenerating the regenerated background map of said image is accomplished by region growing.

11. A method of segmenting a radiographic image into diagnostically relevant and diagnostically irrelevant regions comprising:
   acquiring a digital radiographic image including a matrix of rows and columns of pixels;
   detecting the initial background left point of a histogram of said image;
   detecting the foreground of said image;
   regenerating the background of said image by region growing;
   validating the background of said image;
   merging the background and foreground regions of said image as diagnostically irrelevant regions; and
   extracting the anatomy region of said image as the diagnostically relevant region;
   wherein said detecting the initial background left point includes:
   evaluating each row and column of image pixels for all rising and falling transitions for all candidate backgrounds to foreground (BF) and background to skinline (BS) transitions and record the transition range, transition width, the maximum transition slope and the transition high point;
   building transition range cumulative histogram and auto-selecting new transition range threshold;
   building a transition high point histogram and find a first estimate of a background left point;
   iteratively fine tuning the background left point; and
   verifying the background left point.

12. The method of claim 11 wherein iteratively fine tuning the background left point uses either major peak or major background or both as features for selecting different thresholds in order to control the iteration.

* * * * *